Patented Aug. 31, 1943

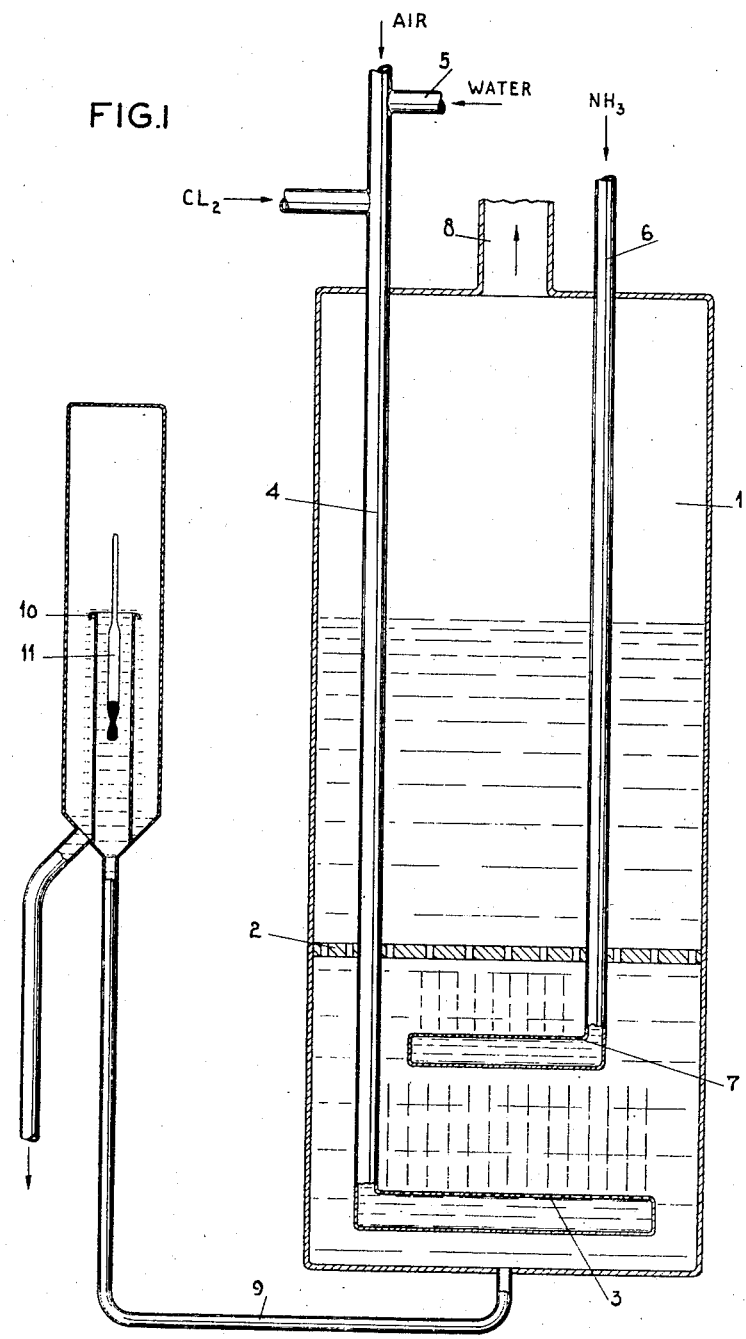

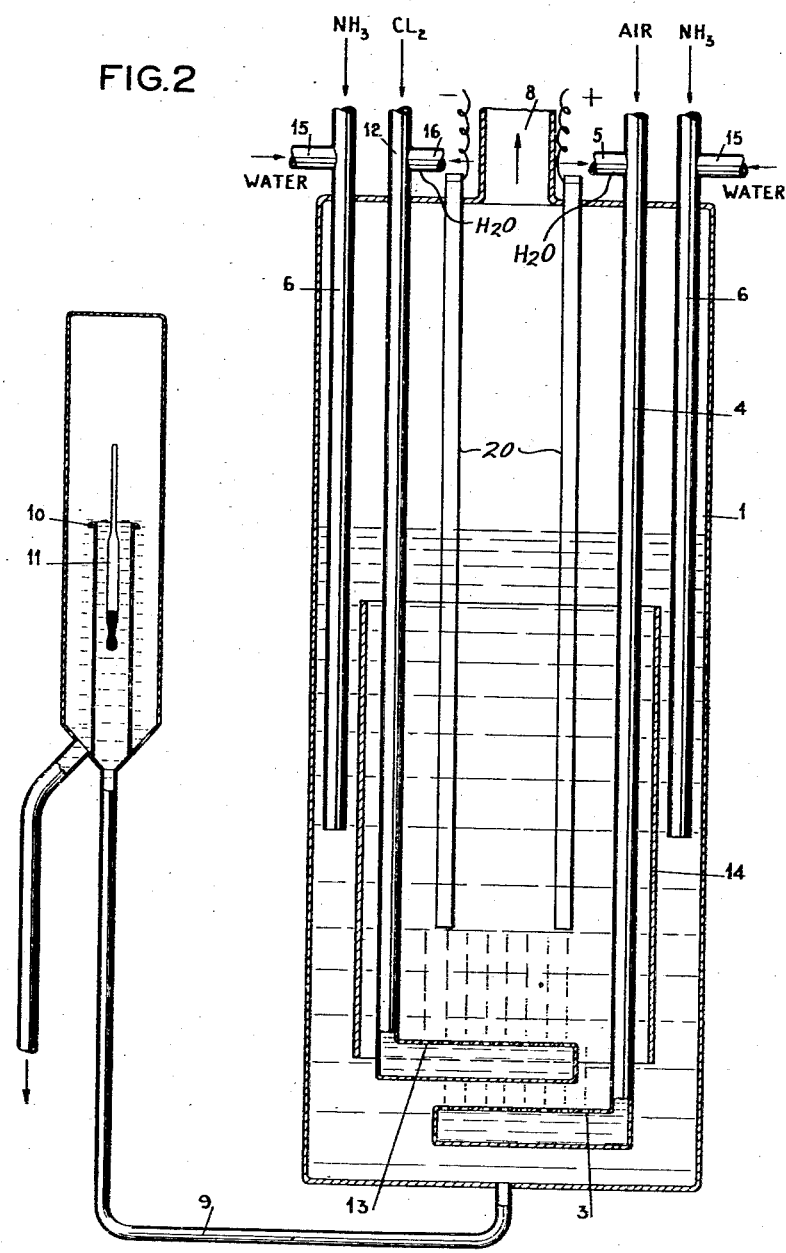

2,328,484

UNITED STATES PATENT OFFICE 2,328,484

PROCESS FOR THE PREPARATION OF NITROGEN CHLORIDE

Albert Gerrit Oosterhuis, Amsterdam, Netherlands; vested in the Alien Property Custodian Application December 16, 1938, Serial No. 246,188
In the Netherlands December 28, 1937

6 Claims. (Cl. 204—101)

My invention relates to an improved process and apparatus for the preparation of halogenamines and particularly for the preparation of nitrogen trichloride.

It is known to make use of halogenamines for improving the baking quality, the colour and the stability of flour. Mainly nitrogen trichloride is used to this effect, but also mono and dichloramine have been proposed to this end. Also halogenamines are employed for sterilising water, sugar solutions, agricultural and horticultural products, fruit and many other substances.

For producing chloramines, chlorine or substances containing active chlorine, for instance calciumhypochlorite, sodiumhypochlorite or hypochlorous acid are brought in reaction with an aqueous solution of an ammonium salt or of ammonia.

The final product which is formed hereby is nitrogen trichloride, i. e., an oily liquid which is very explosive at ordinary temperature. It is removed by bubbling through air or another inert gas, such as carbon dioxide or nitrogen and the volatile nitrogen trichloride is thus carried by the gas to the place where it is applied. In practice this production is always carried out in such a way that the chlorine is led into the ammonium solution in one apparatus, whereupon the chloramine containing solution is passed to a second apparatus where inert gas is blown in. It was considered to be necessary, as appears from the United States patent specification 1,510,132, to permit the reaction between the halogen gas and the ammonium compound to take place during a sufficient interval of time, of at least a minute, before introducing the inert gas. This resulted in the use of complicated apparatus, especially since particular measures are necessary for preventing the formation of nitrogen trichloride drops in case of apparatus defects, these drops being extremely dangerous. Moreover only small concentrations could be used, involving a high water waste.

I have found that it is not necessary to permit the reaction between halogen gas and ammonium compound to take place over a definite interval of time and that chlorine can be quantitatively converted into nitrogen trichloride even when the inert gas is blown in at the same time. Thus it is possible to carry out the reaction in one single apparatus which is obviously of great advantage.

My improved process for the production of halogenamines, particularly nitrogen trichloride includes the feature that the introduction of the halogen gas such as chlorine into an aqueous solution of ammonia or an ammonium compound, the formation of the halogenamine and the bubbling through of an inert gas are carried out in one single apparatus.

It is highly preferable to finely divide the halogen gas and the inert gas, which can be effected by known means. For instance the mixture of chlorine and inert gas may be blown through a filter of glass, coal, ceramic material or the like. If desired the contact between the halogen gas and the aqueous ammonium solution may be increased by placing in the liquid filling means, for instance Raschig rings, saddles of china, beads or balls.

As inert gas I may use air, nitrogen, oxygen, hydrogen and the like.

My present process not only makes it possible to use a much simpler apparatus because the halogen gas may be introduced together with the inert gas through one line but also prevents explosion danger because, in consequence of the presence of a large quantity of inert gas, in the halogen gas the formation of nitrogen trichloride is practically stopped in case the gas supply ceases for one reason or another. By my invention the problem of obtaining a continuous supply of nitrogen trichloride for a continuous application thereof is essentially reduced to one of providing a continuous current of chlorine. The apparatus required is very simple. To this end the apparatus used for the chlorination of potable water and the water in swimming pools is more than sufficient.

By the reaction of halogen gas with ammonium or an ammonium compound acid is formed which accumulates in the apparatus and eventually will give rise to trouble. According to my invention this acid is removed for instance by washing it out with a liquid, preferably water or aqueous solutions, or by neutralizing it. In this way it is possible to keep the acidity of the solution approximately constant and to carry out the preparation of the halogenamines in a continuous way. Therefore the apparatus for carrying out my invention may be provided with a supply line for the washing liquid such as water or an aqueous solution and an outlet, e. g., an overflow for removing reaction liquid.

I prefer, however, to introduce the washing water or solution through the supply line or lines for the halogen gas and/or through the supply line or lines for the inert gas or if desired through the common supply line or lines for these gases if a mixture of halogen gas and inert gas is introduced. In practice the disadvantage was met that the formed ammonium compound tends to crystallize on the filter, through which the halogen gas and/or the inert gas is introduced, thus clogging the filter. By introducing water or an aqueous solution together with these gases this disadvantage is eliminated, because in this way these filters are always maintained clean by washing. By way of example I may keep constant the composition of the solution by washing out by means of a dilute solution of an ammonium compound. In this case it is sufficient to introduce a continuous current of a dilute aqueous solution of an ammonium compound and to remove simultaneously a same volume of reaction liquid.

As ammonium salt preferably an ammonium halide is used such as for instance ammonium chloride in case of the preparation of nitrogen trichloride. Also other ammonium salts may be used, however, for instance ammonium sulfate and in this case sulfuric acid is liberated besides a hydrogen halide, such as hydrochloric acid.

It is also possible to remove the acid by neutralizing it. This may be effected by bringing into the solution a neutralizing agent, such as for instance sodium hydroxide, sodium carbonate, preferably in the form of aqueous solution or calcium carbonate, for instance in the form of lumps of limestone. I much prefer, however, to use ammonia for neutralising the acid, because in this case no foreign substances are introduced into the solution. I may introduce for instance a continuous current of ammonia gas, but I prefer to introduce at the same time water, in order to wash out or remove the ammonium halide which is formed then in excess, thereby maintaining a stationary state, in which the solution contains a definite concentration of ammonium compound. Instead of washing out by means of a dilute solution of an ammonium salt I therefore prefer to wash out by means of an aqueous solution of ammonia.

In the case of the preparation of nitrogen trichloride the reaction is then effected substantially as follows:

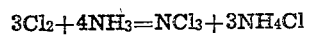

Consequently the proportions are preferably taken such that for 3 molecules of chlorine 4 molecules of ammonia are introduced but if desired also a smaller quantity of ammonia may be introduced, in which case free hydrochloric acid is washed out besides ammonium chloride. It is also possible to introduce more than four mol. of ammonia per 3 mol. of chlorine and then mono or dichloramine is formed which remains in the removed reaction liquid and may be conveyed to the place of application together with this reaction liquid.

Neutralizing the acid has the further advantage that the heat liberated by this neutralization compensates for the cooling of the solution, so that there is no danger that the temperature becomes so low, that the reaction takes place more slowly or not at all. This neutralization heat may be so large that cooling becomes necessary. To this end cooling means for instance a cooling coil through which cold water flows may be arranged in the apparatus. In this way it is possible to control the temperature entirely.

In case the neutralization of the acid is effected by means of ammonia the ammonia gas or liquid is preferably introduced at one or more points, which are separated by one or more partition walls from the point or points where the halogen gas and the inert gas are introduced. This is preferred, because ammonia decomposes halogenamines. By the presence of these partition walls or this partition wall and the bubbling through of the inert gas, circulation of the solution around this partition wall is effected, whereby the ammonia only comes in contact with an acid containing ammonium solution from which the volatile halogenamine has already been removed so that the ammonia is neutralized before reaching points where halogenamine, particularly nitrogen trichloride is formed.

If desired also through the tube or tubes supplying the ammonia water an aqueous solution may be introduced.

Another method for neutralizing the formed acid by means of ammonia consists herein that the preparation of halogenamine by reaction of halogen gas and an aqueous solution of an ammonium-compound is combined with the electrolytic production of halogenamine by electrolyzing an aqueous solution of an ammonium compound or ammonia.

It has appeared that important advantages are obtained by combining these two methods of preparing halogen compounds because in the reaction of halogen gas on an ammonium solution the acid formed must be removed and in the electrolysis primarily ammonia is formed which reduces the yield by one half, whereas the combination of these methods eliminates both these drawbacks by compensating the one with the other. By way of example I will elucidate this with respect to the preparation of nitrogen trichloride.

If chlorine gas is led into an aqueous solution of ammonium chloride, nitrogen trichloride and hydrochloric acid are formed:

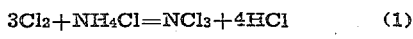 (1)

The hydrochloric acid formed must be removed or neutralized, because otherwise the solution would become too acid and the formation of nitrogen trichloride would be counteracted.

On the other hand if a solution of ammonium chloride is electrolyzed, nitrogen trichloride is formed besides ammonia and hydogen:

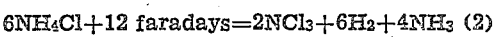 (2)

Consequently the acidity of the solution would be decreased during electrolysis were it not for the fact that this is counteracted because the nitrogen trichloride reacts with ammonia under formation of hydrochloric acid:

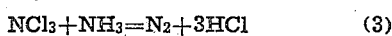 (3)

The reactions 2 and 3 result into an equilibrium, in which half the nitrogen trichloride initially formed is again decomposed:

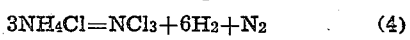 (4)

If, however, the preparation of nitrogen trichloride by reaction of the chlorine gas is combined with the electrolytic production the ammonia formed during electrolysis is prevented from reacting with the formed nitrogen trichloride because this ammonia is neutralized by the hydrochloric acid formed in the reaction of chlorine on ammonium chloride. As a whole then, if the reactions 1 and 2 are combined by addition the following reaction is obtained:

 (5)

This clearly shows the surprising effect of this combination.

Indeed the formation of one molecule of nitrogen trichloride, by the reaction of chlorine gas and ammonium chloride requires, 3 mol. chlorine and 1 mol. ammonium chloride (reaction 1), and by the electrolysis method 3 mol. ammonium chloride (reaction 4) are required, whereas, by the combination of these two reactions it is possible to prepare 1 mol. nitrogen trichloride from only 1 mol. chlorine and 1 mol. ammonium chloride.

It will be obvious that it is not necessary to control the reaction of the halogen gas and the electrolysis in such a way that exactly the equilibrium represented by reaction 5 is reached. Already important advantages are obtained if only partial neutralization takes place of the acid formed during the reaction of halogen gas and the ammonia formed during electrolysis.

If the reaction is conducted so that the reaction of the halogen gas is in excess, acid has to be removed or neutralized. If on the other hand the electrolysis preponderates, the acidity decreases and consequently either acid must be added or the yield is diminished.

It is not necessary that the reaction of the halogen gas and the electrolysis take place simultaneously. Obviously at the start only the halogen gas need be allowed to react with the ammonium chloride solution and then only electrolysis need be employed or conversely. It is also possible to introduce halogen gas intermittently during the electrolysis or to electrolyze intermittently during the reaction of the halogen gas. I prefer, however, to permit the reaction of the halogen gas and electrolysis to take place simultaneously and then to control the halogen gas current and the electric current in such a way with respect to each other that the desired acidity of the solution remains approximately constant.

During this reaction the ammonium compound (NH$_4$Cl) is consumed and must be supplied continuously or intermittently. Therefore this compound or substances from which it can be formed must be added to the solution. Since the introduction of a solid ammonium compound may be troublesome I prefer to introduce ammonia. Preferably the current of halogen gas, the current of ammonia and the electric current are then controlled with respect to each other in such a way that the acidity and/or the ammonia concentration of the solution remain approximately constant.

The formed nitrogen trichloride is removed from the solution by bubbling through a current of inert gas either separately or mixed with the chlorine current.

It is obvious that the expert may vary this process by taking measures he may further desire. For instance it is possible to bring into the reaction solution other salts, e. g. sodium chloride or ammonium phosphate, to bring the solution into circulation, to apply partition walls whereby any ammonia which is introduced can come only into contact with the solution from which the halogenamine has already been removed by the inert gas blown in.

The invention will be further explained by way of example in connection with the accompanying drawings which show, more or less diagrammatically, two embodiments of an apparatus within the present invention, which may be used for carrying out my process.

Figure 1 shows a cross section of one embodiment of such an apparatus,

Figure 2 shows a cross section of a modification of such an apparatus.

By way of example the preparation of nitrogen trichloride in the apparatus of these figures will be explained.

This preparation takes place in a vessel 1 constructed of for instance glass, ceramic material, ebonite, Bakelite, silver or other materials resistant to the action of chlorine, ammonia, hydrochloric acid and nitrogen trichloride. A plate 2, provided with openings is arranged in the vessel 1. Below the plate 2 there is a filter 3 of glass or coal, connected with a line 4 serving for introducing a mixture of air and chlorine. Moreover through the branch pipe 5 water may be introduced, serving to prevent clogging of the filter 3 by the crystallization of salts. This water dilutes regularly the solution of ammonium chloride present in the vessel 1. Ammonia is introduced through a line 6, leading to a dispering device 7. The mixture of air and nitrogen trichloride escapes through line 8. The vessel 1 is connected by means of a tube 9 with an overflow 10, in which a hydrometer 11 is placed.

The operation of the apparatus is very simple. A stream of chlorine and a stream of air is introduced through line 4 and finely divided by the filter 3 in a solution of ammonium chloride present in the vessel 1, or formed therein by the reaction between chlorine and ammonia. The chlorine is quantitatively converted into nitrogen trichloride which is blown out from the solution by the air and which escapes with the air through tube 8 and is led to the place of application for instance for the treatment of flour, the sterilisation of water, disinfecting seed, etc.

The hydrochloric acid formed in the reaction is partly neutralized by the ammonia introduced through line 6 and the dispersing device 7 and fresh ammonium chloride is thereby formed. Preferably a constant stream of chlorine, of air and of ammonia is introduced and these streams may be controlled by valves. Safety means may be provided for automatically stopping the chlorine stream in case the air current is interrupted, or for stopping all other gas streams if one gas stream is interrupted, and if desired moreover a signalling apparatus may be provided to give alarm if a gas stream, particularly the air stream is interrupted.

The water introduced at 5 prevents the solution from becoming too acid or from reaching too high a concentration of ammonium chloride. By determining the density of the solution by means of the hydrometer 11 one can determine whether more or less water must be introduced.

In Figure 2 the reaction vessel is also indicated by reference numeral 1, air is introduced through the distributing device (filter) 3 and tube 4 and chlorine through the distributing device 13 and tube 12. The mixture of air and nitrogen trichloride escapes through tube 8.

Ammonia is introduced through tubes 6, water through tubes 5, 15 and 16 in the supply lines for air, ammonia and chlorine, respectively. The excess of solution is removed through tube 9 and overflow 10 in which a hydrometer 11 is provided.

In this case a cylindrical partition wall 14 is present, which is arranged between the points at which the supply lines 6 for ammonia end and the section at which the chlorine comes into contact with the solution and the nitrogen trichloride is expelled by the air. By consequence of the air stream an upward current is formed within the cylinder 14 and a downward current along the exterior thereof, so that the solution circulates around the partition wall 14. In this way it is ensured that the ammonia only comes in contact with an acid ammonium chloride solution, which is free of nitrogen trichloride.

In the apparatus shown the acid formed must be removed as such or combined as ammonium chloride. This becomes superfluous if the solution is also subjected to electrolysis, for example by means of electrodes 20, whereby ammonia is formed. The amount of electrolysis may be proportioned with respect to the chlorine stream in such a way that the hydrochloric acid formed by the action of chlorine on ammonium chloride is exactly neutralized by the ammonia formed during electrolysis. Then only ammonium chloride has to be supplied. Obviously it is also possible not to operate precisely at the equilibrium state in which the ammonia formed during electrolysis neutralizes the acid formed by the action of the chlorine but either the reaction of the chlorine or the electrolysis can predominate and then an excess of the hydrochloric acid or of ammonia, respectively, must be removed. All these possibilities can be realized in the apparatus shown by the introduction of electrodes 20.

Safety means may be provided for interrupting the electric current, in case that one of the gas currents, particularly the air current stops on account of a defect.

Although the production of nitrogen trichloride only has been described it will be clear that by the same principles also other halogenamines may be prepared. What particular halogenamine is formed depends mainly on the acidity of the solution, nitrogen trichloride being formed in the more acid medium, mono chloramine in the alkaline region, and mixtures in intermediate regions. The volatile halogenamines are removed by the current of inert gas and carried thereby to the place of application. The non-volatile amines remain in the solution and are applied as such in any way desired.

What I claim is:

1. In the manufacture of nitrogen chloride and chloramines, the process which comprises passing gaseous chlorine in a finely divided state into a body of an aqueous solution containing ammonium chloride, simultaneously passing a large volume of an inert gas into said body of solution in quantity sufficient to remove the resulting gaseous products of reaction as they are formed and passing an electric current through said solution between electrodes immersed therein, the current supplied being substantially 12 faradays per 3 gram molecules of chlorine introduced.

2. In the manufacture of nitrogen chloride and chloramines, the process which comprises blowing gaseous chlorine under pressure in a finely divided state into a body of an aqueous solution containing ammonium chloride, simultaneously bubbling a large volume of air through said solution in quantity sufficient to remove the resulting volatile chloro-nitrogen compounds as they are formed and simultaneously electrolyzing said solution, the rate of introduction of the chlorine and the rate of electrolysis being so-correlated that the acidity of the solution remains substantially constant.

3. In the manufacture of nitrogen chloride and chloramines, the process which comprises blowing gaseous chlorine under pressure in a finely divided state into a body of an aqueous solution containing ammonium chloride while simultaneously bubbling through said solution a large volume of an inert gas in quantity sufficient to remove the volatile chloro-nitrogen compounds thereby produced as they are formed and electrolyzing said solution, the rate of introduction of the chlorine and the rate of electrolysis being so-controlled that the chemical reaction in said solution as a whole follows substantially the following equation:

$$3Cl_2 + 3NH_4Cl + 12 \text{ faradays} = 3NCl_3 + 6H_2.$$

4. In the manufacture of nitrogen chloride and chloramines, the process which comprises continuously passing ammonia gas into a body of an aqueous solution containing ammonium chloride at a point separated from the rest of said solution by a partition extending vertically through the body of said solution but spaced some distance from the bottom and from the surface of said solution, continuously passing gaseous chlorine into said solution at another point on the opposite side of said partition and continuously passing a large volume of an inert gas into said solution in quantity sufficient to remove the resulting volatile chloro-nitrogen compounds as they are formed, the point of introduction of the inert gas being so placed that a circulation is set up in said solution whereby the solution moves upwardly at the point at which said chlorine is introduced and downwardly at the point at which said ammonia is introduced.

5. In the manufacture of nitrogen chloride and chloramines, the process which comprises continuously blowing gaseous chlorine under pressure in a finely divided state into a body of an aqueous solution containing ammonium chloride, continuously passing fresh charging solution into said body and withdrawing the resulting spent solution from said body at a rate barely sufficient to prevent crystallization of ammonium chloride and sufficient to maintain the composition of said body substantially constant and continuously bubbling a large volume of an inert gas through said solution in quantity sufficient to remove the resulting volatile chloro-nitrogen compounds as they are formed.

6. In the manufacture of nitrogen chloride and chloramines, the process which comprises continuously blowing gaseous chlorine under pressure in a finely divided state into a body of an aqueous solution containing ammonium chloride while simultaneously bubbling through said solution a large volume of an inert gas in quantity sufficient to remove the volatile chloro-nitrogen compounds thereby produced as they are formed and adding ammonia to said body of solution to neutralize the acid formed during the process, the introduction of chlorine and ammonia being substantially in accordance with the equation:

$$3Cl_2 + 4NH_3 = NCl_3 + 3NH_4Cl.$$

ALBERT GERRIT OOSTERHUIS.